UNITED STATES PATENT OFFICE.

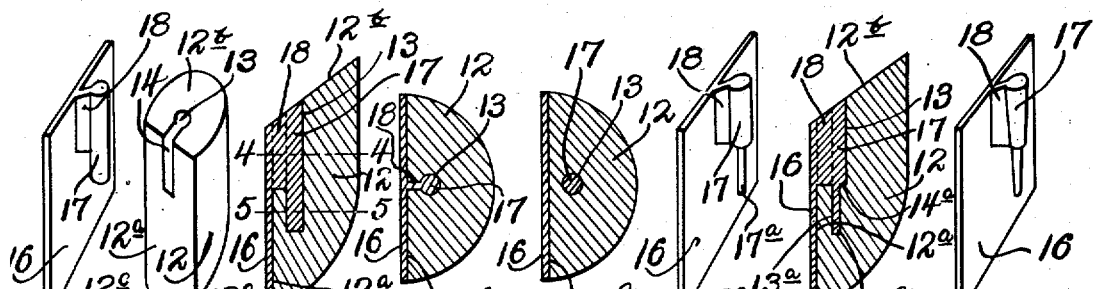
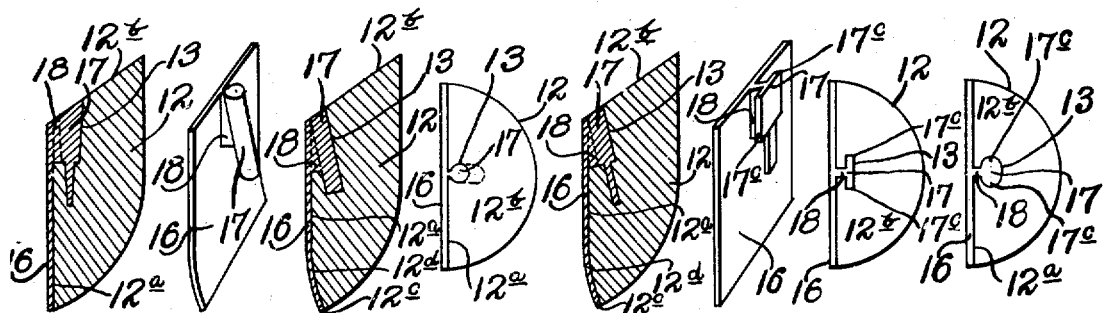
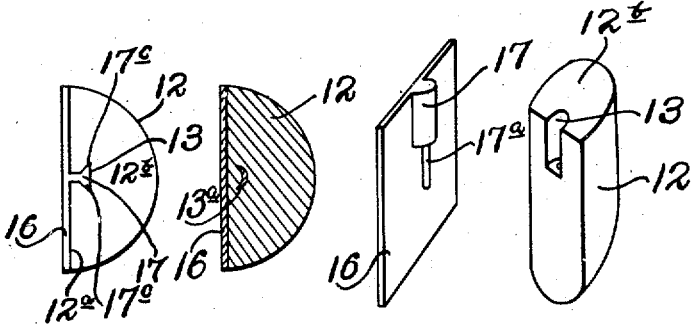

SIMON MYERSON, OF CAMBRIDGE, MASSACHUSETTS.

ARTIFICIAL TOOTH.

1,205,922. Specification of Letters Patent. Patented Nov. 21, 1916.

Application filed July 27, 1916. Serial No. 111,652.

*To all whom it may concern:*

Be it known that I, SIMON MYERSON, a citizen of the United States, residing at Cambridge, in the county of Middlesex and State of Massachusetts, have invented new and useful Improvements in Artificial Teeth, of which the following is a specification.

This invention relates to an artificial tooth composed of a replaceable body of porcelain having a socket, and a metallic backing covering one of the surfaces of the body, and having a tenon filling the socket, said socket and tenon being interengaged in such manner as to form a separable connection between the body and backing and resist displacement of the body by forces of mastication.

The object of the invention is to so improve the form of the socket and tenon as to enable the backing and tenon to strongly support the porcelain body without unduly weakening vital parts of the body by the reduction of its cross sectional area in forming the socket, and without requiring an objectionable increase in the bulk of the body to compensate for said reduction.

To this and other related ends the invention consists in the improvements which I will now proceed to describe and claim.

Of the accompanying drawings forming a part of this specification, Figure 1 represents a perspective view of a front tooth body embodying the invention; Fig. 2 represents a perspective view of the backing for the body shown by Fig. 1; Fig. 3 represents a longitudinal section showing the body and backing assembled; Fig. 4 represents a section on line 4—4 of Fig. 3; Fig. 5 represents a section on line 5—5 of Fig. 3; Fig. 6 represents a longitudinal section illustrating another embodiment of the invention; Fig. 7 represents a perspective view of the backing and tenon shown by Fig. 6; Fig. 8 represents a longitudinal section illustrating a modification of the embodiment shown by Figs. 6 and 7; Fig. 9 represents a perspective view of the backing and tenon shown by Fig. 8; Fig. 10 represents an end view looking toward the ridge lap, and illustrating another embodiment of the invention; Fig. 11 represents a section on line 11—11 of Fig. 10; Fig. 12 represents a perspective view of the backing and tenon shown by Figs. 10 and 11; Fig. 13 represents a view similar to Fig. 11, showing the socket and tenon reduced at their inner end portions, as in Figs. 6 and 7; Fig. 14 represents a perspective view of the backing and tenon, illustrating a flanged tenon; Fig. 15 represents an end view looking toward the ridge lap and showing the backing and flanged tenon illustrated by Fig. 14; Figs. 16 and 17 represent views similar to Fig. 15, and illustrating different flange formations on the tenon; Figs. 18, 19 and 20 illustrate modifications hereinafter described.

The same reference characters indicate the same or similar parts in all the views.

In the drawings, 12 represents a porcelain tooth body having a flat lingual face $12^a$ and an inclined ridge lap $12^b$, the latter constituting the end of the tooth opposite that on which the incisal edge $12^c$ is formed.

In the following description I call the portion of the body having the incisal edge the acting portion, which in this form of tooth is relatively thin. I call the portion having the ridge lap $12^b$ the base portion, the same being relatively thick.

The body 12 is provided with a socket 13 extending from the base portion into the acting portion, said socket having an end mouth opening on the ridge lap and a mouth opening on the lingual face, the socket and mouth being preferably keyhole shaped in cross section. The lateral mouth extends from the ridge lap toward the incisal edge, and has a closed end relatively near the ridge lap, said lateral mouth being wholly within the thickest base portion of the body so that it does not extend into the portion of the lingual face at the thinner portion of the body. The socket 13 is preferably extended from the closed end of the lateral mouth 14 into the thinner portion of the body, as shown.

16 represents a backing formed to cover the lingual face $12^a$ of the body and provided with a tenon 17 formed to closely fit the socket in the body. Said tenon includes a neck portion 18 formed to occupy the lateral mouth 14 of the socket, as shown by Figs. 1 and 2. The outer end of the tenon portion 17 is inclined and may or may not be flush with the inclined ridge lap $12^b$ of the body. The tenon and neck are preferably shaped as indicated by Figs. 2 and 4, to have an interlocking engagement with the socket and the lateral mouth.

It will now be seen that when the body and backing are assembled reciprocal bearing surfaces are provided to resist the forces of mastication, these being the abutments formed by the closed inner end of the socket and the closed end of the mouth 14, and the shoulders formed by the inner ends of the tenon and the inner end of the neck 18, said shoulders bearing on said abutments. It will also be seen that the portions of the socket and tenon which include the lateral mouth 14 and the neck 18 are within the relatively thick base portion of the body where there is sufficient material to preclude the possibility of unduly weakening the base portion by the formation of the socket and lateral mouth therein and at the same time avoid the necessity of unduly increasing the bulk of the base portion to compensate for the loss of material caused by the formation of the socket and lateral mouth. It will be further seen that the portions of the socket and tenon below the closed end of the lateral mouth 14 are within the relatively thin acting portion of the body having the incisal edge, said portions affording a sufficiently firm connection without either weakening the acting portion of the body or requiring an objectionable increase of its bulk.

The outer end of the tenon being inclined and flush with the inclined ridge lap 12$^b$ of the body, the reduction or grinding away of the ridge lap, which is often necessary in practice, also reduces or grinds away the end of the tenon.

Figs. 6, 7, 8 and 9 show the tenon and socket formed to reduce to a minimum the weakening of the above mentioned acting portion of the body by the reduction of its cross sectional area occasioned by the socket. In the embodiment of the invention shown by Figs. 6 and 7, the part 13$^a$ of the socket which extends into the said acting portion is reduced in diameter or cross section, an abutment or floor 14$^a$ being formed at the junction of the reduced part 13$^a$ with the main or outer part of the socket. The tenon has a reduced inner part 17$^a$ fitting the reduced socket part, and a shoulder bearing on the floor or abutment 14$^a$. The said floor as here shown coincides with the closed end of the lateral mouth 14, but may be either below or above said closed end.

In the embodiment of the invention shown by Figs. 8 and 9, the reduction of the inner parts of the socket and tenon is caused by tapering the socket and tenon. The tapered socket and tenon may be shouldered, as shown, to provide the socket with a floor or abutment, and the tenon with a shoulder to bear on said abutment. The said floor and shoulder in each embodiment disclosing the same may constitute the only acting reciprocal bearing surfaces, the inner end of the tenon and the inner end of the neck 18 having no bearing on the inner end of the socket and on the inner end of the mouth 14.

When the body and backing are assembled the socket wall in each of the two embodiments last described provides an effective abutment or seat for the tenon, enabling the latter to effectively resist forces of mastication, the strength of the acting portion of the body being so little impaired that liability to break is reduced to the minimum, without requiring an objectionable increase in the bulk or cross sectional area of the acting portion of the body.

Figs. 10, 11, 12 and 13 show the lingual face of the body provided with a portion 12$^d$ which is inclined relatively to the main portion 12. The socket is similarly inclined and is substantially parallel with the portion 12$^d$, the backing and tenon being correspondingly formed. This form provides an incisal edge portion beveled on its lingual face, and is preferable in some cases.

The inner portions of the inclined socket and tenon may be reduced, as shown by Fig. 13, for the purpose described in connection with Figs. 6, 7, 8 and 9.

The tenon may be provided with oppositely projecting flanges 17$^e$, as shown by Figs. 14, 15, 16 and 17, said flanges increasing the width of the tenon so that its projection into the body may be considerably reduced. The socket is formed to closely fit the flanged tenon, as shown.

The flanges may be formed as shown by Figs. 14 and 15, or may be otherwise formed, as indicated by Figs. 16 and 17. It is obvious that the flanged tenon may have a reduced inner part, as shown by Fig. 14, the inner part of the socket being correspondingly reduced. It is also obvious that the flanged tenon and the socket formed to receive it may be inclined relatively to the main portion of the lingual face.

The reduced portion 13$^a$ of the tenon may have its cross section elongated and crescent-shaped, as indicated by Fig. 18, the reduced portion of the socket being correspondingly formed.

Figs. 19 and 20 show a modification in which the enlarged portions of the socket and tenon are substantially semi-cylindrical, the lateral mouth of the socket and the neck portion of the tenon which occupies said mouth not being reduced in width.

It will be understood that all of the principles and modifications of the invention are possible in either the beveled edge or the flat back type of facing.

Having described my invention, I claim:

1. An artificial tooth comprising a body having a lingual face, an incisal edge, a ridge lap and a socket extending from the ridge lap into the body of the tooth and provided with an end mouth on the ridge lap, said socket having a main portion near the ridge lap and a reduced portion with a lateral mouth extending from the ridge lap toward the incisal edge, said main portion having a floor facing the ridge lap, and a metallic backing formed to cover the lingual face and having a tenon formed to enter said end mouth and closely fit the socket and its lateral mouth, the socket wall forming an abutment coöperating with the tenon to resist force of mastication.

2. An artificial tooth comprising a body having a lingual face, an incisal edge, a ridge lap, and a socket extending from the ridge lap into the body of the tooth and provided with an end mouth on the ridge lap, and with a lateral mouth extending from the ridge lap toward the incisal edge, said mouth having a closed end relatively near the ridge lap, a considerable portion of said socket being entirely closed between the lateral mouth and the incisal edge, and a metallic backing formed to cover the lingual face and having a tenon formed to enter said end mouth and closely fit the socket and its lateral mouth.

3. An artificial tooth comprising a body having a lingual face, an incisal edge, a ridge lap, and a socket extending from the ridge lap into the body, said socket being provided with an end mouth on the ridge lap, and with a mouth in the thicker portion of the body extending rearwardly to the lingual face, said mouth having a closed end relatively near the ridge lap, said socket having a portion extended a considerable distance below the closed end of the mouth into the acting portion of the body, and a metallic backing formed to cover the lingual face, and having a tenon shaped to enter said mouth and closely fit the socket and its lateral mouth, the tenon being provided with oppositely projecting lateral flanges fitting recesses formed for their reception in the socket.

4. An artificial tooth comprising a body having a ridge lap, and a socket extending therefrom into the interior of said body, said socket having a reduced inner portion, the main portion of the socket being in the thicker portion of the tooth, and extending to and opening on the lingual face, the inner end of the said main portion providing a shoulder forming a floor facing said ridge lap, relatively near the same, and a metallic backing shaped to have an extended bearing on the lingual face of said body and having a tenon projecting from its inner face and complemental to said socket, said tenon having a shoulder abutting against said floor when the tenon is within the socket.

In testimony whereof I have affixed my signature.

SIMON MYERSON.